May 31, 1955

N. L. BRISTOW 2,709,356

PORTABLE ANTITHEFT DEVICE

Filed Feb. 3, 1953

INVENTOR
Nicholas L. Bristow

BY *Stevens, Davis, Miller & Mosher*

ATTORNEYS

May 31, 1955
N. L. BRISTOW
2,709,356
PORTABLE ANTITHEFT DEVICE
Filed Feb. 3, 1953
2 Sheets-Sheet 2
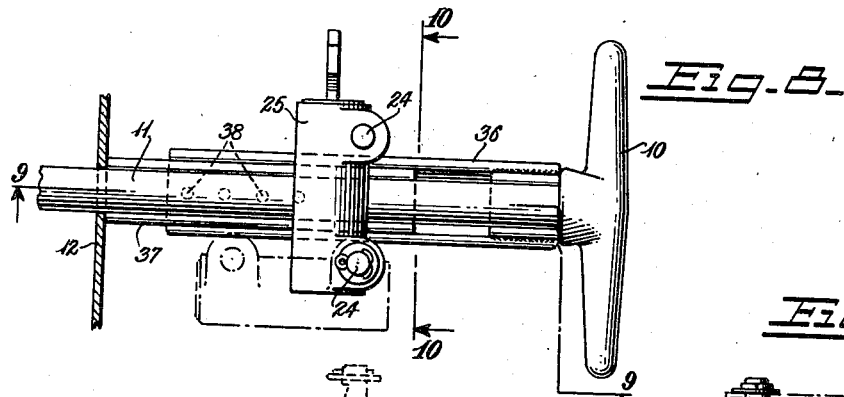
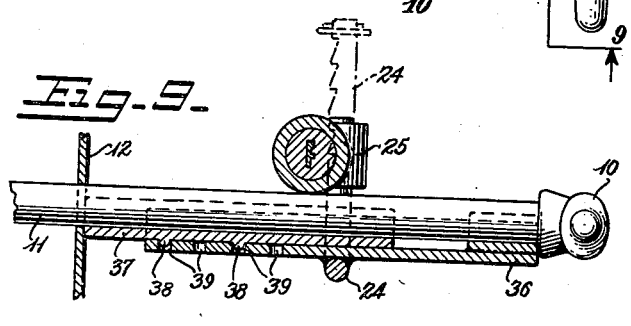
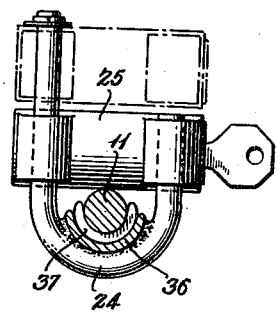
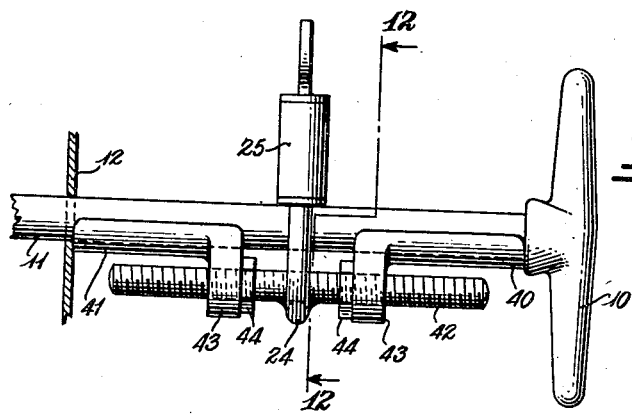
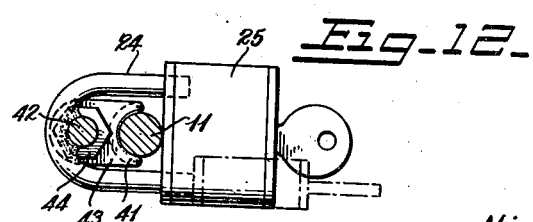
INVENTOR.
*Nicholas L. Bristow*
BY
*Stevens, Davis, Miller & Mosher*
ATTORNEYS

United States Patent Office 2,709,356
Patented May 31, 1955

2,709,356

PORTABLE ANTITHEFT DEVICE

Nicholas L. Bristow, New York, N. Y.

Application February 3, 1953, Serial No. 334,845

2 Claims. (Cl. 70—14)

This invention relates to an antitheft locking device and more particularly to such a device for use with an emergency brake in an automobile wherein the brake handle extends out of the dash-board.

Many antitheft measures have been taken to prevent the stealing of an automobile but most of them have had only limited success. It is an object of this invention to supplement those measures already taken by providing an additional antitheft device which makes it much more difficult for the thief to accomplish his task. More particularly it is an object of this invention to provide an antitheft device in the form of a locking device for the emergency brake of an automobile. Particular utility for this locking device is found in automobiles which have the emergency brake handle extending out of the dashboard. By attaching this device to the brake handle the brake is locked in the "on" position and even though the thief may gain access to the interior of the car and ultimately succeed in starting the engine, he will have considerable difficulty in moving the car from its original position.

These and other objects will become apparent from the following description of the accompanying drawings.

Figure 8 is a vertical plan view of another embodiment of the invention;

Figure 9 is a view taken along line 9—9 of Figure 8;

Figure 10 is a view taken along line 10—10 of Figure 8;

Figure 11 is a vertical plan view of another embodiment of the invention; and

Figure 12 is a view taken along line 12—12 of Figure 11.

In automobiles of the type in which the brake handle is pulled horizontally out of the dashboard it is the usual case that to unlock the brake the handle is rotated and a spring means then automatically returns the brake handle and consequently the brake into the unlocked position. In accordance with this invention, a locking device is applied to this type of brake handle system.

Figure 1:
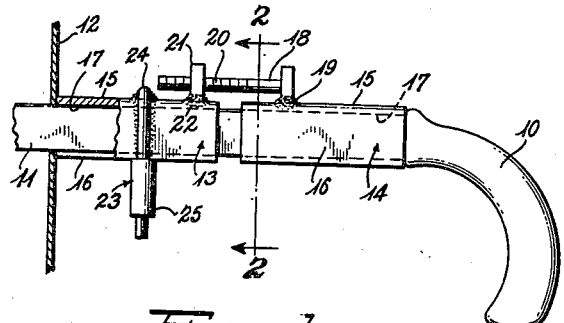
Figure 1 is a vertical plan view of the first embodiment of the locking device constructed in accordance with this invention shown in position on a brake handle which extends out of the dashboard of a car.
Figure 2:
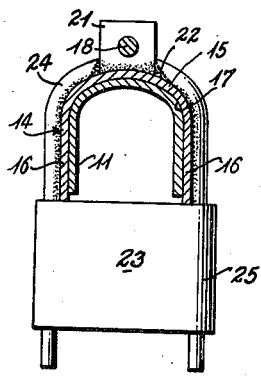
Figure 2 is a view taken along line 2—2 of Figure 1.

Referring to Figures 1 and 2, the brake handle 10 is attached to the outboard end of a lever 11 which extends out of the dashboard 12. In these figures the brake is shown in locked position. The locking device that is applied to the brake handle consists of an elongated member shown in two pieces 13 and 14 and provision is made to adjust the overall length of this elongated member. It is important that the member be adjustable in length because even in the same make of car the lever may not extend out of the dashboard a uniform amount in each car. One means of making this elongated member adjustable in length is shown in Figures 1 and 2.

The elongated member, as stated above, consists of two pieces 13 and 14. Each piece has a base or top surface 15 and two side surfaces 16. These surfaces are contiguous and form a channel 17 which channel is coextensive in length with the elongated member. As shown in these figures a bolt 18 is fixed, preferably by weld 19, to the top surface 15 of the piece 14. This bolt is threaded at 20 and extends longitudinally of the piece 14 and over the end thereof. To the other piece 13 is fixed a nut 21 by weld 22. This nut is, of course, internally threaded and adapted to receive the threaded portion 20 of the bolt 18. The amount of threaded portion 20 that engages through the nut 21 determines the overall length of the elongated member which, in turn, is determined by the length of lever extending out of the dash when the brake is in the locked position.

A padlock 23 has a hasp 24 and a body portion 25. The hasp is fixed by any means, such as welding, to the top surface 15 of the piece 13. It extends along the side surfaces 16 and locks with the body portion 25 across the channel 17. With the padlock in unlocked position, that is with the hasp disengaged from the body portion, and the correct length of elongated member established as noted above, the device is put into place. The pieces 13 and 14 engage over the lever and then the padlock is locked. It is then impossible without breaking the locking device or without a correct key to unlock the emergency brake.

Figure 3:
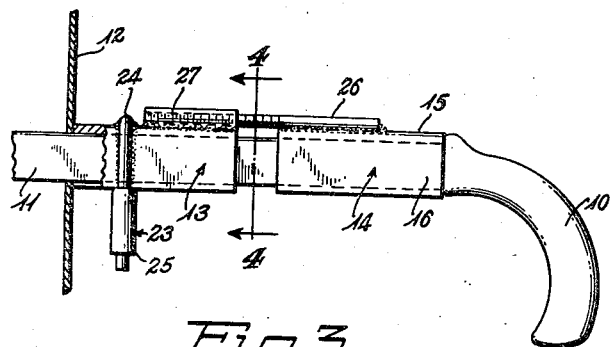
Figure 3 is another embodiment of the invention.
Figure 4:
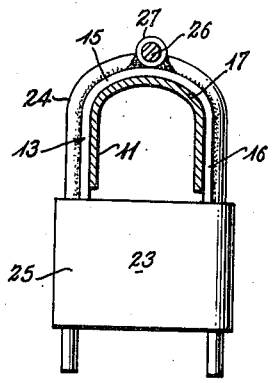
Figure 4 is a view taken along the line 4—4 of Figure 3.

Turning next to Figures 3 and 4 there is shown another embodiment of this invention. This embodiment is the same in all respects as that shown in Figures 1 and 2 except for the means of adjusting the elongated member. Here instead of a bolt as the elongated cylindrical threaded member, a threaded stud 26 is used, and instead of a nut as the threaded receiving member, an internally threaded sleeve 27 is used. This locking device of these figures is placed on the lever in the same manner as explained in connection with the embodiment of Figures 1 and 2.

Figure 5:
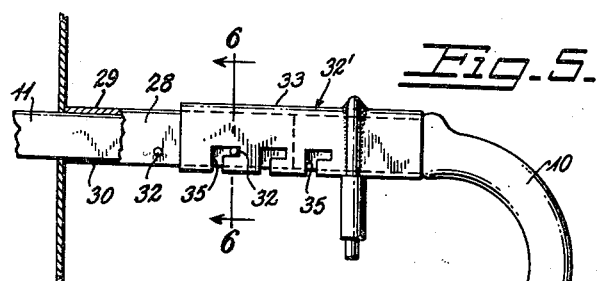
Figure 5 is still another embodiment of the invention.
Figure 6:
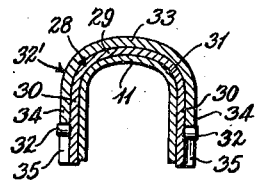
Figure 6 is a view taken along the line 6—6 of Figure 5.
Figure 7:
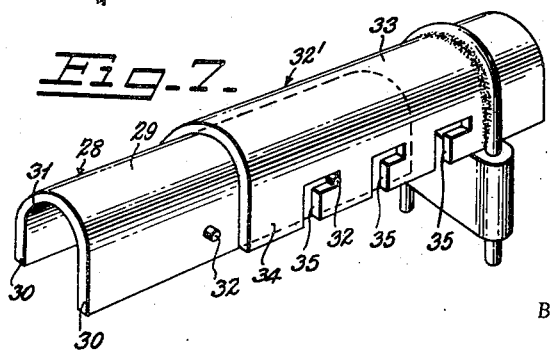
Figure 7 is a perspective view of the locking device shown in Figures 5 and 6.

Another embodiment is shown in Figures 5 to 7. In this embodiment the adjustable length feature is obtained in a slightly modified manner. The piece 28 again has a base surface 29 and side surfaces 30 to form a channel 31. Studs 32 are arranged in horizontal alignment along sides 30. The piece 32 has also three surfaces, a top surface 33 and side surfaces 34. In the side surfaces 34 are positioned bayonet slots 35 to receive the studs 31. The three surfaces of the piece 32 are arranged to form a channel complementary in configuration to the three surfaces of piece 28. The two pieces are engaged with the studs engaging in the bayonet slots which confers a desired overall length to the elongated member and then the device is placed over the lever and the padlock is locked. The features of this embodiment are the same as the first two except for those features particularly described above.

Still another embodiment is shown in Figures 8 to 10. The elongated adjustable length member consists of two pieces 36 and 37 which overlie each other, each of these pieces having the base and side surfaces previously described with respect to the other embodiments. The piece 37 has a plurality—in this instance two—of laterally extending horizontally aligned studs 38 which are mounted to the base surface of the piece 37. These studs are received in recesses 39 in the base surface of the piece 36. A padlock having a hasp 24 and a body portion 25 as in the other embodiments engages over both pieces. This lock, however, is shown with a different key arrangement than that of the other embodiments. The hasp is mounted to the base surface of the member 36 and extends over the side surfaces to lock with the body portion over the channel formed by the pieces. To extend or shorten the length of the locking member, the studs are aligned with different recesses. Of course the studs and recesses may be reversed as far as the piece on which they appear is concerned.

Another embodiment is shown in Figures 11 and 12. The locking member consists of two pieces 40 and 41 each having the base and side surfaces previously described with respect to the other embodiments. These surfaces form a channel to receive the lever 11. An elongated threaded member 42 is received at its opposite ends by threaded nuts 43 mounted on the base surfaces of the pieces. Lock nuts 44 may be provided for alignment purposes. The hasp 24 is mounted to the member 42 and extends laterally therefrom to enclose the lever 11 between it and the body portion 25. To adjust the length of the locking member the locking nuts are moved and then the pieces, or at least one piece, are rotated about the member 42. The threaded engagement of the member 42 and nuts 44 produce, upon this rotation, an increase or decrease of length as desired.

The embodiments have been shown in the figures as including U-shaped pieces as forming the elongated member. This, however, is not necessary. The pieces making up the elongated member may be any other configuration in cross section as long as a channel is provided to receive the brake lever. Another requirement of the third embodiment as shown in Figures 5 to 7 is that the second piece has surfaces which form a channel complementary to the surfaces of the first piece whatever those surfaces of the first piece may be like. Additionally, the padlock may be on either piece and the cooperating members such as nut and bolt of Figures 1 and 2 and stud and sleeve of Figures 3 and 4 may be reversed as far as the particular piece on which they appear is concerned.

What have been shown are preferred embodiments of the present invention but other embodiments obvious from the teachings herein to those skilled in the art are contemplated to be within the spirit and scope of the following claims.

What is claimed is:

1. A locking device comprising an elongated adjustable length member, said member consisting of two pieces, each of said pieces having three contiguous surfaces, a base surface and two side surfaces, extending therefrom, forming an elongated adjustable length channel, an elongated threaded member, means to receive opposite ends of said threaded member, said means being mounted to the base surface of each of said pieces, a padlock including a hasp and a body portion, said hasp being fixed to said elongated threaded member and extending laterally of said threaded member to lock with said body portion.

2. A locking device comprising an elongated adjustable length member, said member comprising two end pieces defining an elongated open channel and an intermediate connecting piece, said pieces being interconnected to adjust the length of the channel formed thereby and a padlock including a hasp and a body portion, said hasp being fixed to the intermediate piece in a position to lock with said body portion transversely of the mouth of the channel defined by said members.

References Cited in the file of this patent

UNITED STATES PATENTS

| | | |
|---|---|---|
| 1,071,756 | Kovsky et al. | Sept. 2, 1913 |
| 1,097,081 | Coon | May 19, 1914 |
| 1,388,149 | Friedrich | Aug. 16, 1921 |